US011475145B2

(12) United States Patent
Hu et al.

(10) Patent No.: US 11,475,145 B2
(45) Date of Patent: Oct. 18, 2022

(54) METHODS AND APPARATUS FOR IMPLEMENTING A SECURE DATABASE USING PROGRAMMABLE INTEGRATED CIRCUITS WITH DYNAMIC PARTIAL RECONFIGURABILITY

(71) Applicant: Intel Corporation, Santa Clara, CA (US)

(72) Inventors: Kekai Hu, Portland, OR (US); Amitabh Das, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 16/221,298

(22) Filed: Dec. 14, 2018

(65) Prior Publication Data

US 2019/0138739 A1    May 9, 2019

(51) Int. Cl.
| | |
|---|---|
| *G06F 21/60* | (2013.01) |
| *G06F 16/2455* | (2019.01) |
| *H04L 9/12* | (2006.01) |
| *G06F 21/76* | (2013.01) |
| *H04L 9/32* | (2006.01) |

(52) U.S. Cl.
CPC ........ *G06F 21/606* (2013.01); *G06F 16/2455* (2019.01); *G06F 16/24552* (2019.01); *G06F 21/602* (2013.01); *G06F 21/76* (2013.01); *H04L 9/12* (2013.01); *H04L 9/3234* (2013.01); *H04L 2209/122* (2013.01); *H04L 2209/125* (2013.01)

(58) Field of Classification Search
CPC ............... G06F 21/606; G06F 16/2455; G06F 16/24552; G06F 21/76; G06F 21/602; H04L 9/12; H04L 9/3234; H04L 2209/122; H04L 2209/125
See application file for complete search history.

(56) References Cited

U.S. PATENT DOCUMENTS

| | | |
|---|---|---|
| 6,957,340 B1 | 10/2005 | Pang et al. |
| 8,127,130 B2 | 2/2012 | Ellis |
| 8,713,327 B1 | 4/2014 | Peterson et al. |
| 8,898,480 B2 | 11/2014 | Lamacchia et al. |
| 9,590,635 B1 | 3/2017 | Sengupta |

(Continued)

OTHER PUBLICATIONS

Sukhwan et al., "Database Analytics Acceleration using FPGAs", Proceedings of the 21st international conference on Parallel architectures and compilation techniques, Sep. 19-23, 2012. p. 411-420.

(Continued)

*Primary Examiner* — Cheng-Feng Huang
(74) *Attorney, Agent, or Firm* — Fletcher Yoder, P.C.

(57) ABSTRACT

A programmable logic device that is interposed between a client device and a database server is provided. The client device may issue read and write queries to the programmable logic device. The programmable logic device may serve as a cache. For read queries, confidential data that is stored locally on the programmable device or retrieved from the database server may be encrypted before sending it back to the client device. Non-confidential data may be left unencrypted and can be sent back to the client device in unencrypted form. The programmable logic device may be partially reconfigured during runtime to update database securities settings without causing unnecessary downtime for the overall system.

20 Claims, 9 Drawing Sheets

(56) References Cited

U.S. PATENT DOCUMENTS

| | | | |
|---|---|---|---|
| 2004/0181679 A1* | 9/2004 | Dettinger | G06F 21/6245 713/193 |
| 2009/0055638 A1* | 2/2009 | Nakano | H04L 9/32 713/1 |
| 2011/0035576 A1* | 2/2011 | Grittke | H03K 19/17752 713/100 |
| 2014/0281169 A1* | 9/2014 | Mehrotra | G06F 12/0866 711/103 |
| 2015/0006890 A1* | 1/2015 | Roth | G06F 21/6254 713/165 |
| 2015/0039901 A1* | 2/2015 | Freeman | G06F 21/602 713/189 |
| 2015/0055776 A1* | 2/2015 | Taylor | H04L 9/14 380/28 |
| 2015/0127599 A1* | 5/2015 | Schiebeler | G06F 12/128 707/602 |
| 2015/0269383 A1* | 9/2015 | Lang | H04L 63/20 726/1 |
| 2017/0003917 A1* | 1/2017 | Nakamori | H04L 67/42 |
| 2018/0081840 A1 | 3/2018 | Custodio | |
| 2018/0285596 A1* | 10/2018 | Jones | G06F 21/552 |
| 2019/0095567 A1 | 3/2019 | Weber et al. | |
| 2019/0149320 A1* | 5/2019 | Keselman | H04L 9/14 380/279 |
| 2019/0236284 A1* | 8/2019 | Hersans | H04L 63/12 |

OTHER PUBLICATIONS

Mykletun et al., "Incorporating a Secure Coprocessor in the Database-as-a-Service Model", Innovative Architecture for Future Generation High-Performance Processors and Systems, Jan. 17-19, 2005, p. 38-44.

Vliegen, "Partial and dynamic FPGA reconfiguration for security applications", Ku Leuven Arenberg Doctoral School, Jun. 2014, p. 1-180.

Microsoft, "Project Catapult", Microsoft Research. Retreived on Oct. 30, 2018. Retrieved from <https://www.microsoft.com/en-us/research/project/project-catapult/>.

* cited by examiner

500

| NAME | BANK ACCT # | BALANCE |
|---|---|---|
| Sally | 12345 | $20,155 |
| John | 22334 | $10 |
| Nancy | 50002 | $103,880 |
| ⋮ | | |

502-1: Sally row
502-2: John row
502-3: Nancy row

| EMPLOYEE | EMPLOYEE ID | SALARY |
|---|---|---|
| Jane | 0012 | $100,000 |
| David | 0103 | $60,000 |
| Peter | 0055 | $120,000 |
| ⋮ | | |

512-1: Jane row
512-2: David row
512-3: Peter row

FIG. 5B

METHODS AND APPARATUS FOR IMPLEMENTING A SECURE DATABASE USING PROGRAMMABLE INTEGRATED CIRCUITS WITH DYNAMIC PARTIAL RECONFIGURABILITY

BACKGROUND

This relates to integrated circuits and, more particularly, to programmable integrated circuits as part of a database system.

Programmable integrated circuits such as field-programmable gate array (FPGA) devices are a type of integrated circuit that can be programmed by a user to implement a desired custom logic function. In a typical scenario, a logic designer uses computer-aided design tools to design a custom logic circuit. When the design process is complete, the computer-aided design tools generate configuration data. The configuration data is loaded into memory elements to configure the devices to perform the functions of the custom logic circuit.

The demand for using FPGAs as a hardware accelerator within database systems has risen in recent years. In particular, database performance can be substantially improved by using an FPGA as a cache for efficient and rapid access of data. Security concerns associated with FPGA caches, however, need to be addressed before their deployment in real world applications. One solution that has been proposed requires performing encryption/decryption for each and every query to the database. Encrypting all database queries in this way, however, imposes high performance overhead.

It is within this context that the embodiments described herein arise.

BRIEF DESCRIPTION OF THE DRAWINGS

FIGS. 5A and 5B are diagrams of illustrative database tables in accordance with an embodiment.

DETAILED DESCRIPTION

The present embodiments relate to accessing a database while using a programmable integrated circuit (e.g., a field-programmable gate array or "FPGA") as a cache.

There may be two different types of database queries: a secure database query (e.g., a query that deals with sensitive or confidential data) and a non-secure database query (e.g., a query that deals with non-sensitive or non-confidential data). Thus, for secure queries that process confidential information, encryption and decryption will be applied. In contrast, for non-secure queries that process non-confidential information, no encryption or decryption will be applied. In particular, the FPGA can be partially reconfigured during runtime to update desired database security settings without interrupting the entire system. Operating an FPGA-accelerated database system in this way can dramatically improve performance of the database system without compromising the security of the overall system.

It will be recognized by one skilled in the art, that the present exemplary embodiments may be practiced without some or all of these specific details. In other instances, well-known operations have not been described in detail in order not to unnecessarily obscure the present embodiments.

Figure 1:
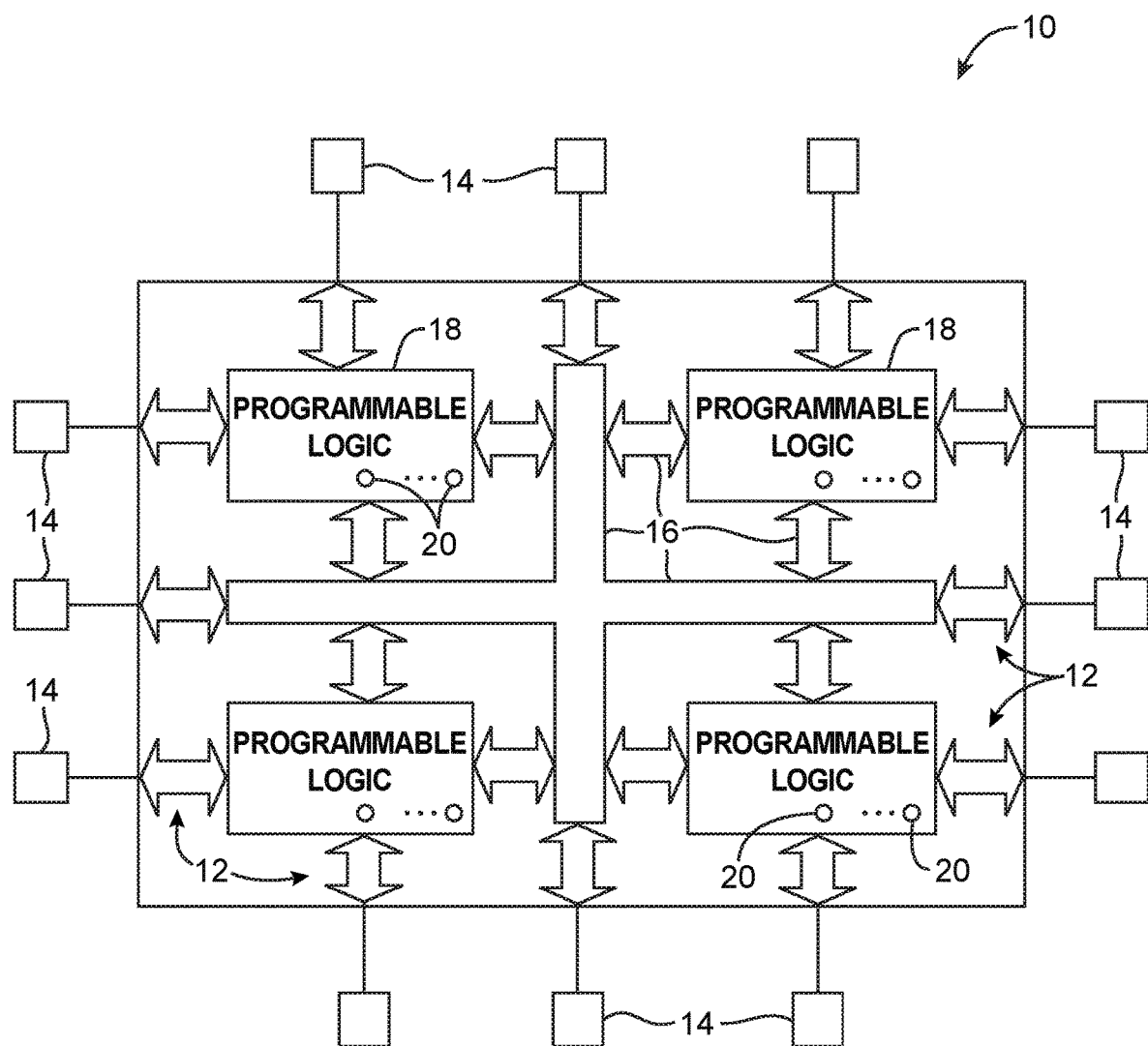
FIG. 1 is a diagram of an illustrative programmable integrated circuit in accordance with an embodiment.

An illustrative programmable integrated circuit such as programmable logic device (PLD) 10 is shown in FIG. 1. As shown in FIG. 1, programmable integrated circuit 10 may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Programmable integrated circuit 10 contains memory elements 20 that can be loaded with configuration data (also called programming data) using pins 14 and input-output circuitry 12. Once loaded, the memory elements 20 may each provide a corresponding static control output signal that controls the state of an associated logic component in programmable logic 18. Typically, the memory element output signals are used to control the gates of metal-oxide-semiconductor (MOS) transistors. Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

A typical memory element 20 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 20, so CMOS-based memory element implementations are described herein as an example. In the context of programmable integrated circuits, the memory elements store configuration data and are therefore sometimes referred to as configuration random-access memory (CRAM) cells.

Figure 2:
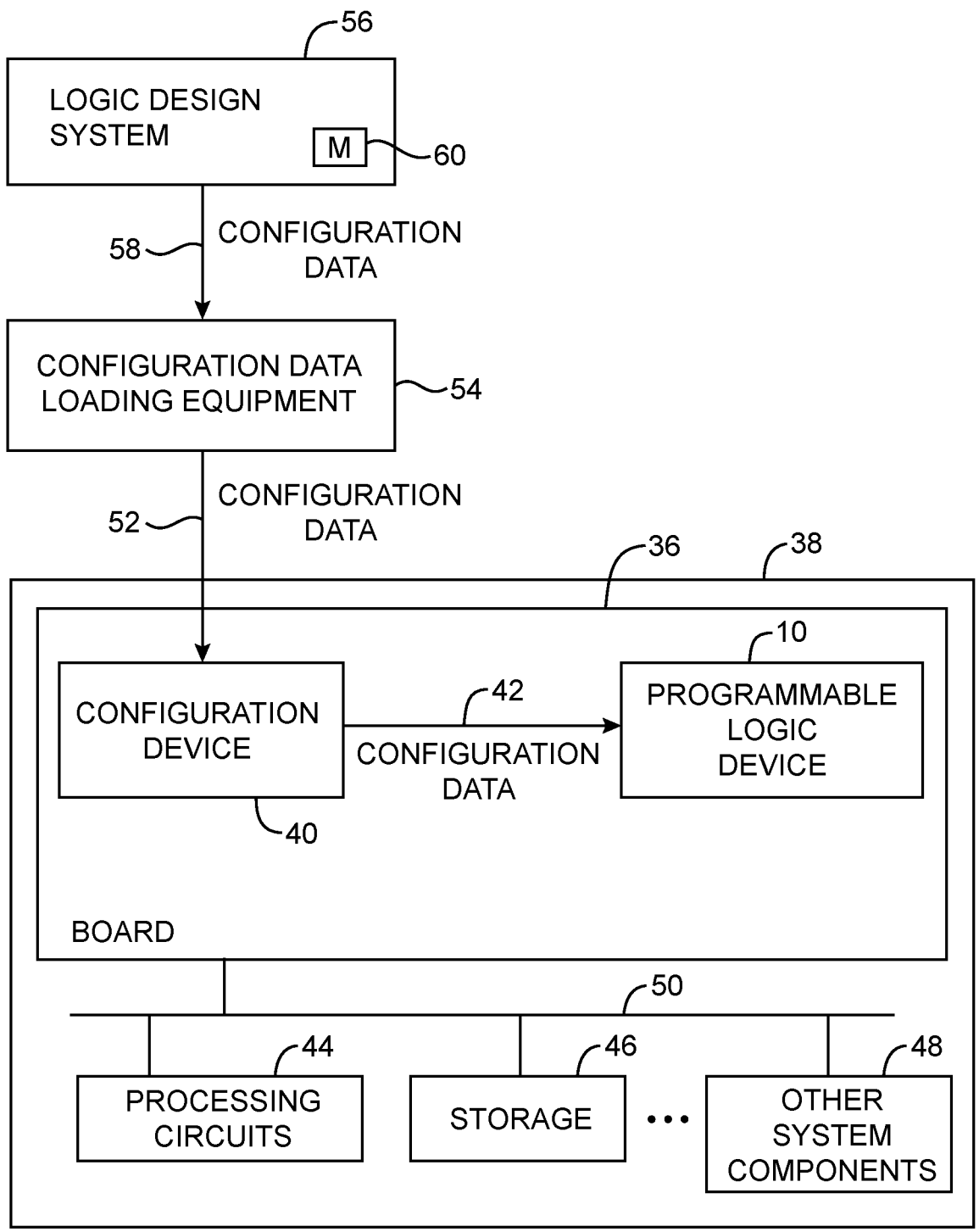
FIG. 2 is a diagram showing how configuration data is created by a logic design system and loaded into a programmable device to configure the device for operation in a system in accordance with an embodiment.

An illustrative system environment for device 10 is shown in FIG. 2. Device 10 may be mounted on a board 36 in a system 38. In general, programmable logic device 10 may receive configuration data from programming equipment or from other suitable equipment or device. In the example of FIG. 2, programmable logic device 10 is the type of programmable logic device that receives configuration data from an associated integrated circuit 40. With this type of arrangement, circuit 40 may, if desired, be mounted on the same board 36 as programmable logic device 10.

Circuit 40 may be an erasable-programmable read-only memory (EPROM) chip, a programmable logic device configuration data loading chip with built-in memory (sometimes referred to as a "configuration device"), or other suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more boards such as board 36 or other suitable mounting structures or housings and may be interconnected by buses, traces, and other electrical paths 50.

Configuration device 40 may be supplied with the configuration data for device 10 over a path such as path 52. Configuration device 40 may, for example, receive the configuration data from configuration data loading equipment 54 or other suitable equipment that stores this data in configuration device 40. Device 40 may be loaded with data before or after installation on board 36.

It can be a significant undertaking to design and implement a desired logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

As shown in FIG. 2, the configuration data produced by a logic design system 56 may be provided to equipment 54 over a path such as path 58. The equipment 54 provides the configuration data to device 40, so that device 40 can later provide this configuration data to the programmable logic device 10 over path 42. Logic design system 56 may be based on one or more computers and one or more software programs. In general, software and data may be stored on any computer-readable medium (storage) in system 56 and is shown schematically as storage 60 in FIG. 2.

In a typical scenario, logic design system 56 is used by a logic designer to create a custom circuit design. The system 56 produces corresponding configuration data which is provided to configuration device 40. Upon power-up, configuration device 40 and data loading circuitry on programmable logic device 10 is used to load the configuration data into CRAM cells 20 of device 10. Device 10 may then be used in normal operation of system 38.

After device 10 is initially loaded with a set of configuration data (e.g., configuration device 40 may be used to load in a configuration bitstream into device 10), device 10 may be reconfigured by loading a different set of configuration data. Sometimes it may be desirable to reconfigure only a portion of the memory cells on device 10 via a process sometimes referred to as "partial reconfiguration" (PR). As memory cells are typically arranged in an array, partial reconfiguration can be performed by writing new data values only into selected portion(s) in the array while leaving portions of array other than the selected portion(s) in their original state. Performing partial reconfiguration during runtime enables a portion of device 10 to be dynamically reconfigured without having the turn off the entire device, thereby minimizing system downtime.

Figure 3:
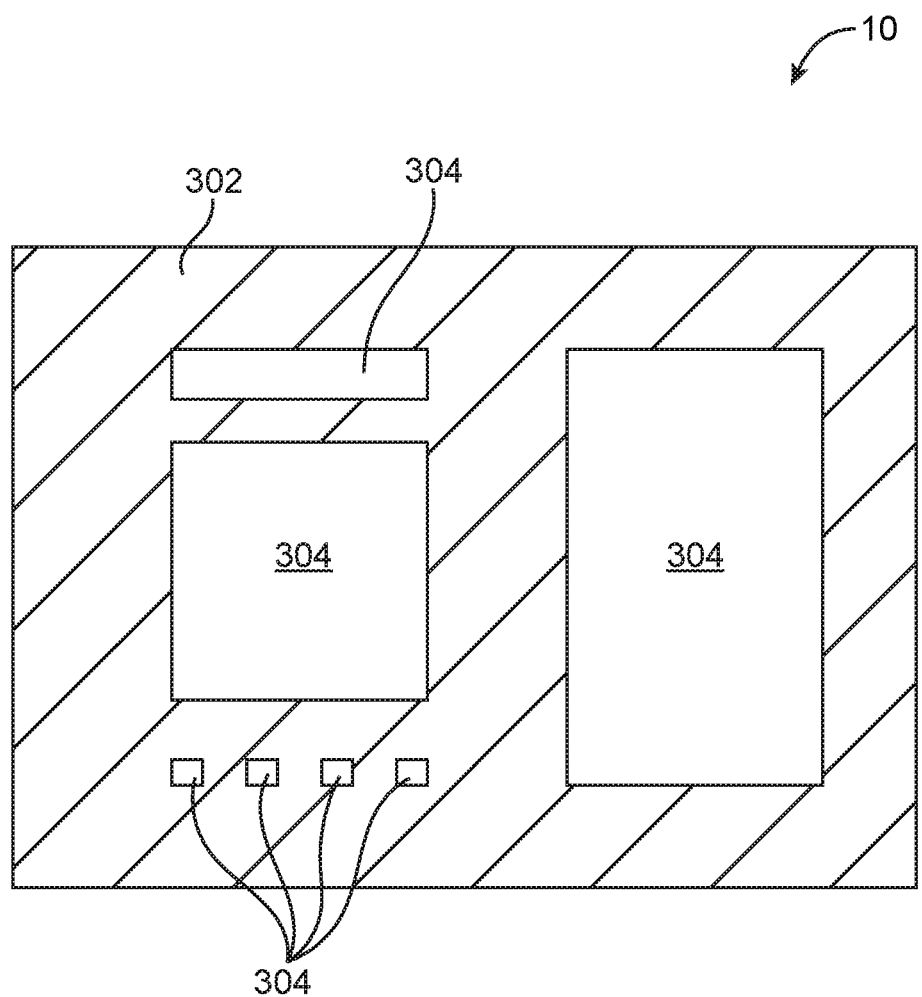
FIG. 3 is a diagram showing how a programmable integrated circuit can include static (non-reconfigured) partitions and dynamically reconfigurable partitions in accordance with an embodiment.

FIG. 3 is a diagram showing how programmable device 10 can include static (non-reconfigured) partitions and dynamically reconfigurable partitions. As shown in FIG. 3, shaded regions 302 may represent static partitions (e.g., portions of the circuit design that is not disturbed during dynamic PR operations), whereas non-shaded regions 304 may represent dynamic partially reconfigurable partitions (e.g., portions of the circuit design that will be updated during dynamic PR operations). Regions 302 and 304 are non-overlapping. A circuit can belong either to the static partition or the PR partition. Thus, portions of the circuit design on device 10 that are not designated as partially reconfigurable may be generally considered to be part of static partition 302. The allocation of static and PR regions as shown in FIG. 3 is merely illustrative and is not intended to limit the scope of the present embodiments. Generally, the PR regions 304 may be any suitable size and shape and can be positioned at any location on device 10.

Figure 4:
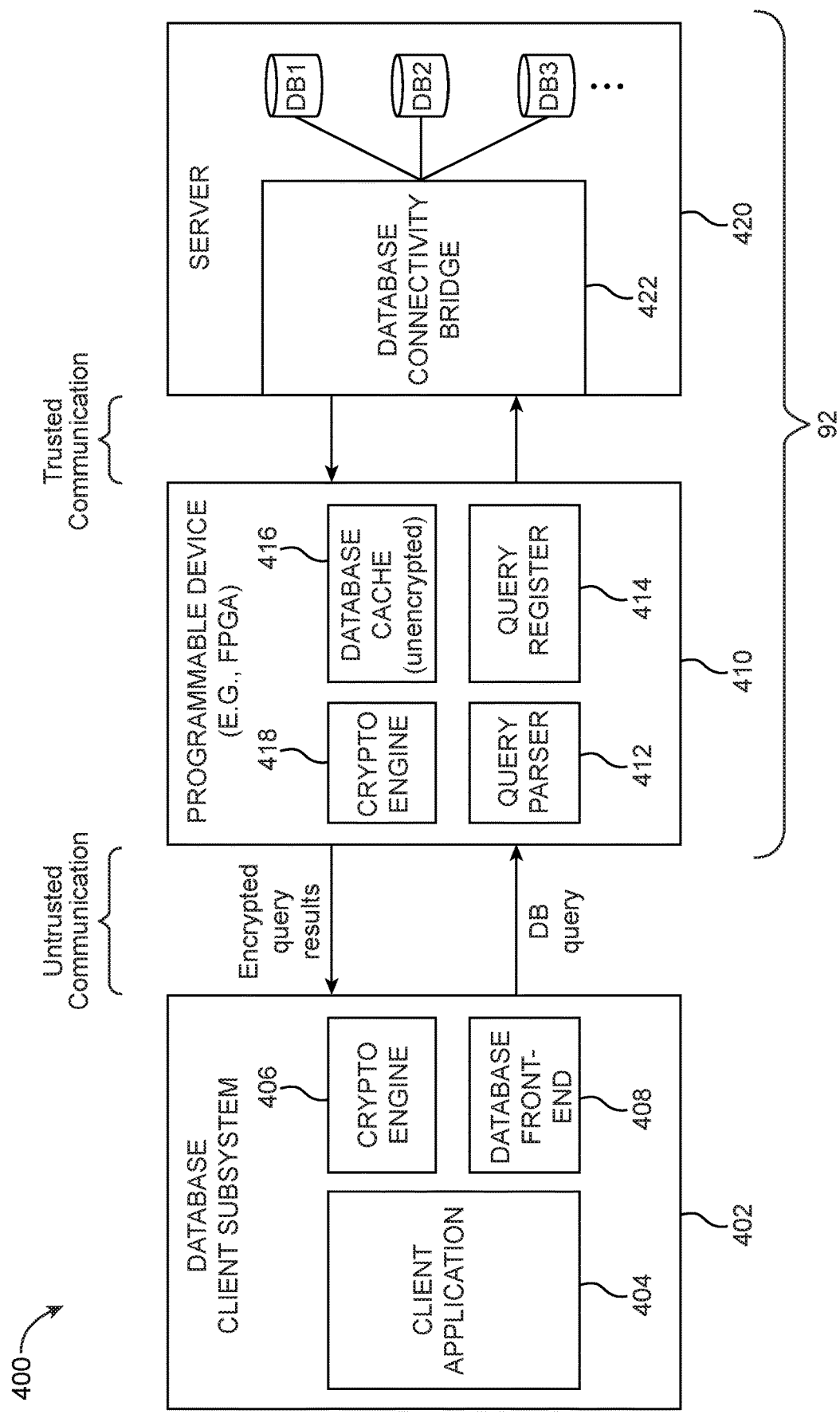
FIG. 4 is a diagram of an illustrative secure FPGA-based database system in accordance with an embodiment.

Partial reconfiguration may be a particularly useful feature for implementing a secure database system. FIG. 4 is a diagram of an illustrative database system such as system 400 that includes a database client subsystem 402 operable to access a server subsystem 420 via a programmable acceleration device 410. Client subsystem 402 may represent a mobile device, a desktop computer, a laptop computer, a tablet device, or other suitable client computing equipment that can be used to submit a database query. A client application 404 may run on client 402, where client application 404 might perform one or more tasks that require accessing information on the server. Client device 402 may also include a cryptography engine 406 configured to encrypt or decrypt incoming/outgoing data and a database front-end component 408 configured as an interface for submitting database queries to the server.

Server 420 may include a plurality of databases such as first database DB1, second database DB2, third database DB3, etc. A database connectivity bridge 422 on server 420 is configured as an interface for accessing the various databases on the server (e.g., bridge 422 is capable of routing data to and from the appropriate database depending on the type of data is the currently being requested or updated). In general, the databases within server 420 may be used to store information in any type of database structures.

In one suitable embodiment, server 420 may store information in one or more database tables. FIGS. 5A and 5B are diagrams of illustrative database tables that can be stored on server 420. In the example of FIG. 5A, table 500 may represent a financial database having at least three fields: (1) name, (2) bank account number, and (3) bank account balance. A first record 502-1 in table 500 includes information for Sally, listing her bank account number 12345 and her corresponding balance of $20,155. A second record 502-2 in table 500 includes information for John, listing his bank account number 22334 and his corresponding balance of $10. A third record 502-3 in table 500 includes information for Nancy, listing her bank account number 50002 and her corresponding balance of $103,880. In general, table 500 may include hundreds, thousands, or millions of records/entries for storing information for any suitable number of bank account users. The information in table 500 may be stored in a single database (e.g., in DB1, DB2, or DB3) or may be distributed across multiple databases (e.g., the names can be stored in DB1, bank account numbers can be stored in DB2, and bank account balance information can be stored in DB3).

In the example of FIG. 5B, table 500 may represent a company database having at least three fields: (1) employee name, (2) employee identification (ID) number, and (3) salary. A first record 512-1 in table 510 includes information for Jane, listing her employee ID number 0012 and her corresponding salary of $100,000. A second record 512-2 in table 510 includes information for David, listing his employee ID number 0103 and his corresponding salary of $60,000. A third record 512-3 in table 510 includes information for Peter, listing his employee ID number 0055 and his corresponding salary of $120,000. In general, table 510 may include hundreds, thousands, or millions of records/entries for storing information for any suitable number of company employees. The information in table 510 may be stored in a single database (e.g., in DB1, DB2, or DB3) or may be distributed across multiple databases (e.g., the names can be stored in DB1, employee ID numbers can be stored in DB2, and salary information can be stored in DB3).

The examples of FIGS. 5A and 5B are merely illustrative and are not intended to limit the scope of the present embodiments. In general, the databases within server 420 may be configured to store any number of database tables, where each table can have any number of fields with any number of entries.

In accordance with an embodiment, programmable logic device 410 (e.g., an FPGA of the type described in connection with FIGS. 1-3) may be interposed between client 402 and server 420 and may serve as an intermediate-level cache for the client to help improve the overall performance, configurability, and security of system 400. Programmable device 410 may include a query parser circuit such as query parser 412 configured to parse incoming database queries received from client front-end 408, a query requesting circuit such as query requester 414 configured to send corresponding query requests to database connectivity bridge 422 at server 420, cache circuitry such as database cache 416 configured to store recently accessed data, and a cryptography engine 418 configured to encrypt or decrypt incoming/outgoing data. Database cache 416 (sometimes referred to as FPGA cache) may be implemented using any type of volatile or non-volatile memory elements.

In practice, programmable device 410 and server 420 may be physically housed within a datacenter 92. As such, the communications interface between FPGA 410 and server 420 may be considered to be a "trusted" or secure communications path. In contrast, client device 402 is typically not part of datacenter 92 (i.e., client 402 is a remote device that is attempting to access potentially sensitive information stored within the datacenter). As such, the communications interface between client 402 and FPGA 410 may be considered to be an "untrusted" or non-secure communications path. As a result, any confidential or sensitive data that is exchanged between client 402 and FPGA 410 should be encrypted for security reasons.

In general, datacenter 92 may be used to process a variety of different requests. As examples, data processing system 92 may receive a data processing request to perform encryption, decryption, machine learning, video processing, voice recognition, image recognition, data compression, database search ranking, bioinformatics, network security pattern identification, spatial navigation, or some other specialized task.

Conventional database security solutions encrypts all information fetched from the database. Some database queries, however, fetch results including non-confidential data that need not be protected. Encrypting and decrypting all fetched results can substantially degrade database access performance.

In accordance with another embodiment, programmable device 410 is configured to provide isolation between confidential and non-confidential information stored in the database. To accomplish this, FPGA 410 will only encrypt query results associated with confidential information but will leave the database entries associated with non-confidential information unencrypted. Selectively encrypting only a subset of database results in this way dramatically improves the performance of the FPGA-accelerated database system without compromising on the security of the overall system.

Figure 6:
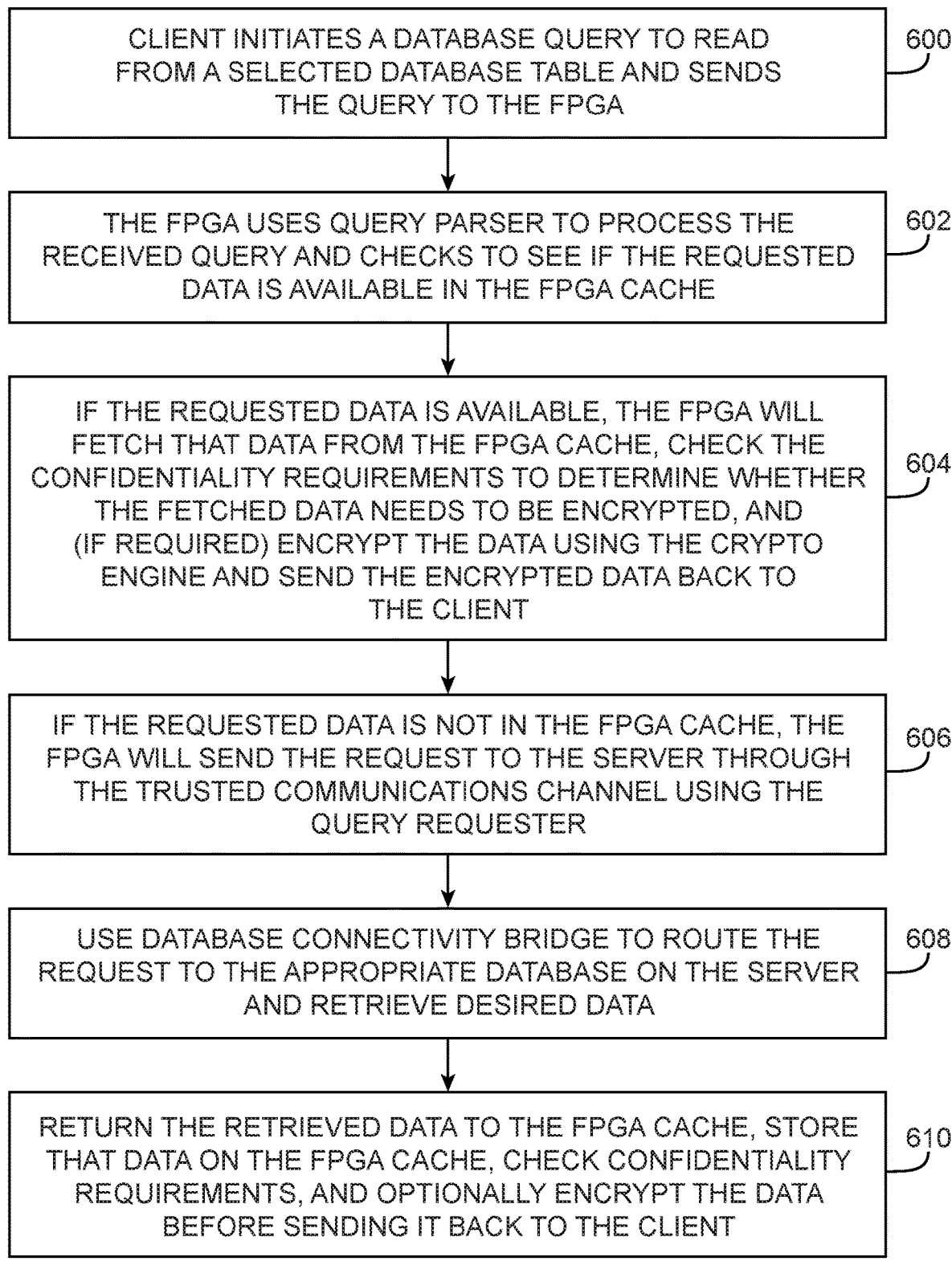
FIG. 6 is a flow chart of illustrative steps for performing a database read operation in accordance with an embodiment.

FIG. 6 is a flow chart of illustrative steps for performing a database read operation. At step 600, client 402 initiates a database query to read from a selected database table and sends the read query to FPGA 410. Client 402 may issue queries written using any type of database query language such as Structured Query Language or SQL (as an example). A read query output from client 402 typically does not contain any data and is thus generally unencrypted.

At step 602, FPGA 410 uses query parser 412 to process the received query and checks to see if the requested data is available locally in database cache 416. As an example, the read query may be to simply return Sally's bank account balance (see, e.g., FIG. 5A). As another example, the read query may be to return all users with bank account balances of greater than $1000. As yet another example, the read query may be to return all employee names with an employee ID that is less than 100 (see, e.g., FIG. 5B). Data stored in FPGA cache 416 should be unencrypted.

If the requested data is currently available on FPGA cache 416 (i.e., if there is a "cache hit"), FPGA 410 will fetch that data from the FPGA cache, check the confidentiality requirements to determine whether the fetched data needs to be encrypted, and if required, encrypt the data using crypto engine 418 and send the encrypted data back to client 402 (step 604). For instance, in the example above where Sally's bank account balance is requested, if that entry is presently in cache 416, the retrieved cache result might be encrypted assuming bank account balances are considered confidential information. However, in the example above where all user names with bank account balances of greater than $1000 are requested, the retrieved cache result need not be encrypted assuming usernames are considered non-confidential or non-sensitive data.

If the requested data is not currently available on FPGA cache 416 (i.e., if there is a "cache miss"), FPGA 410 may send the request to server 420 through the trusted communications channel using query requester 414 (step 606). At step 608, the database connectivity bridge 422 will route the request to the appropriate database on server 410 and retrieve the desired data. At step 610, server 420 will return the retrieved data to FPGA cache 416, store that data on the FPGA cache to ensure consistency across system 92, check confidentially requirements associated with the retrieved data (e.g., determine whether the retrieved data is considered "confidential" and thus needs to be encrypted), and optionally encrypt the data before sending it back to client 402.

Figure 7:
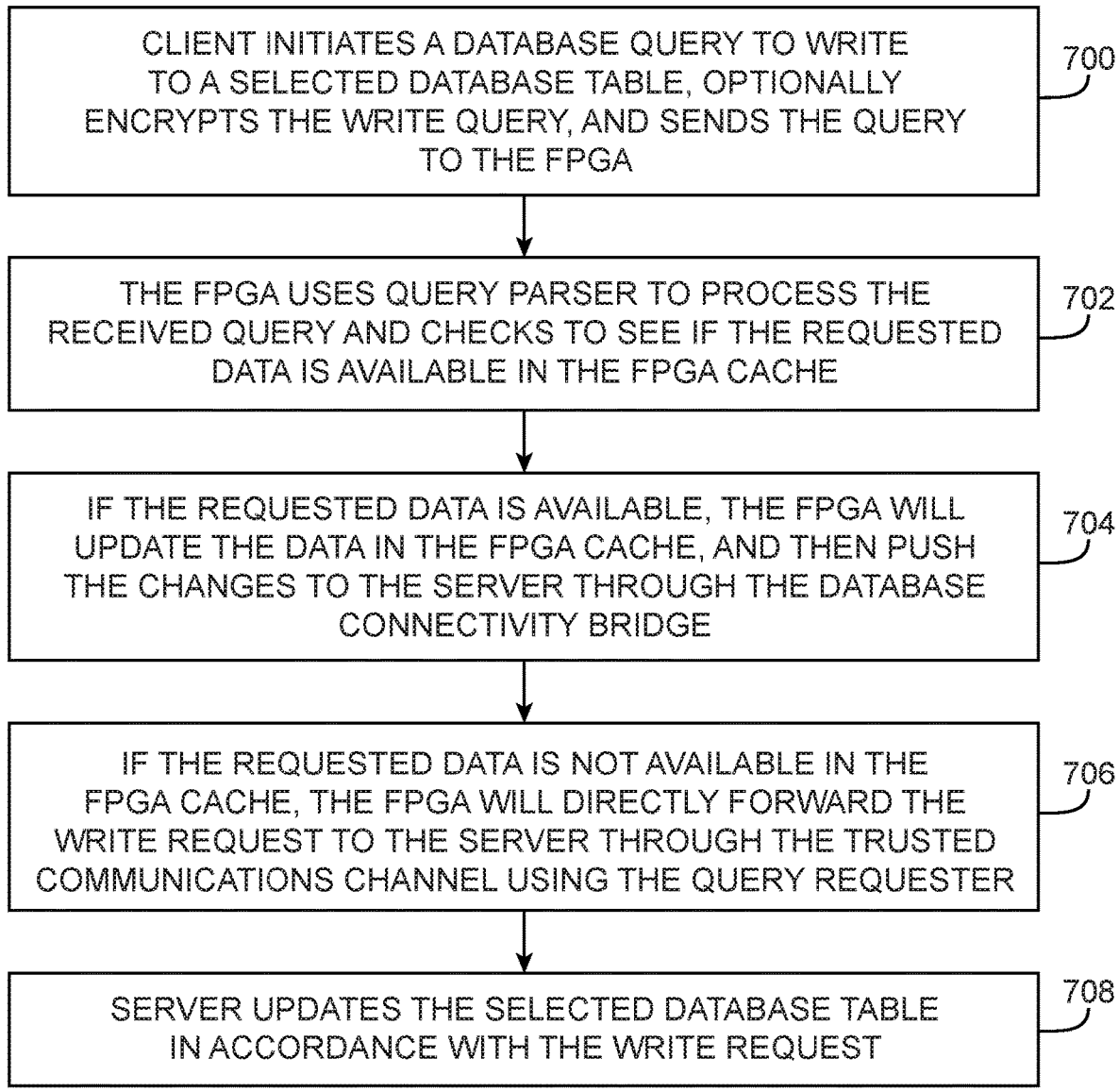
FIG. 7 is a flow chart of illustrative steps for performing a database write operation in accordance with an embodiment.

FIG. 7 is a flow chart of illustrative steps for performing a database write operation. At step 700, client 402 initiates a database query to load new data into a selected database table, optionally encrypts the write query, and then sends the write query to FPGA 410. The write data might be encrypted if it includes sensitive information; the encryption may be performed using crypto engine 406 before the write query leaves client 402. Client 402 may issue queries written using any type of database query language such as Structured Query Language or SQL (as an example). If the write query is encrypted, FPGA 410 may use crypto engine 418 to decrypt the write query before passing the query to parser 412.

At step 702, FPGA 410 uses query parser 412 to process the received query and checks to see if the requested data is available locally in database cache 416. As an example, the write query may be to simply update Nancy's bank account balance (see, e.g., FIG. 5A). As another example, the write query may be to increase all user account balances by 1% interest.

If the requested data is currently available on FPGA cache 416 (i.e., if there is a "cache hit"), FPGA 410 will update that data entry in the FPGA cache, and then push the changes to the server though database connectivity bridge 422 to ensure consistency of data across system 92 (step 704).

If the requested data is not presently available on FPGA cache 416 (i.e., if there is a "cache miss"), FPGA 410 will directly forward the write request to the server through the trusted communications channel using query requester 414 (step 706) without updating cache 416.

At step 708, the server updates the selected database table in accordance with the write request. Generally, server 420 does not return any data for a write request. Server 420 may optionally send a write acknowledgement back to the client to notify the client that the write is complete.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

Figure 8:
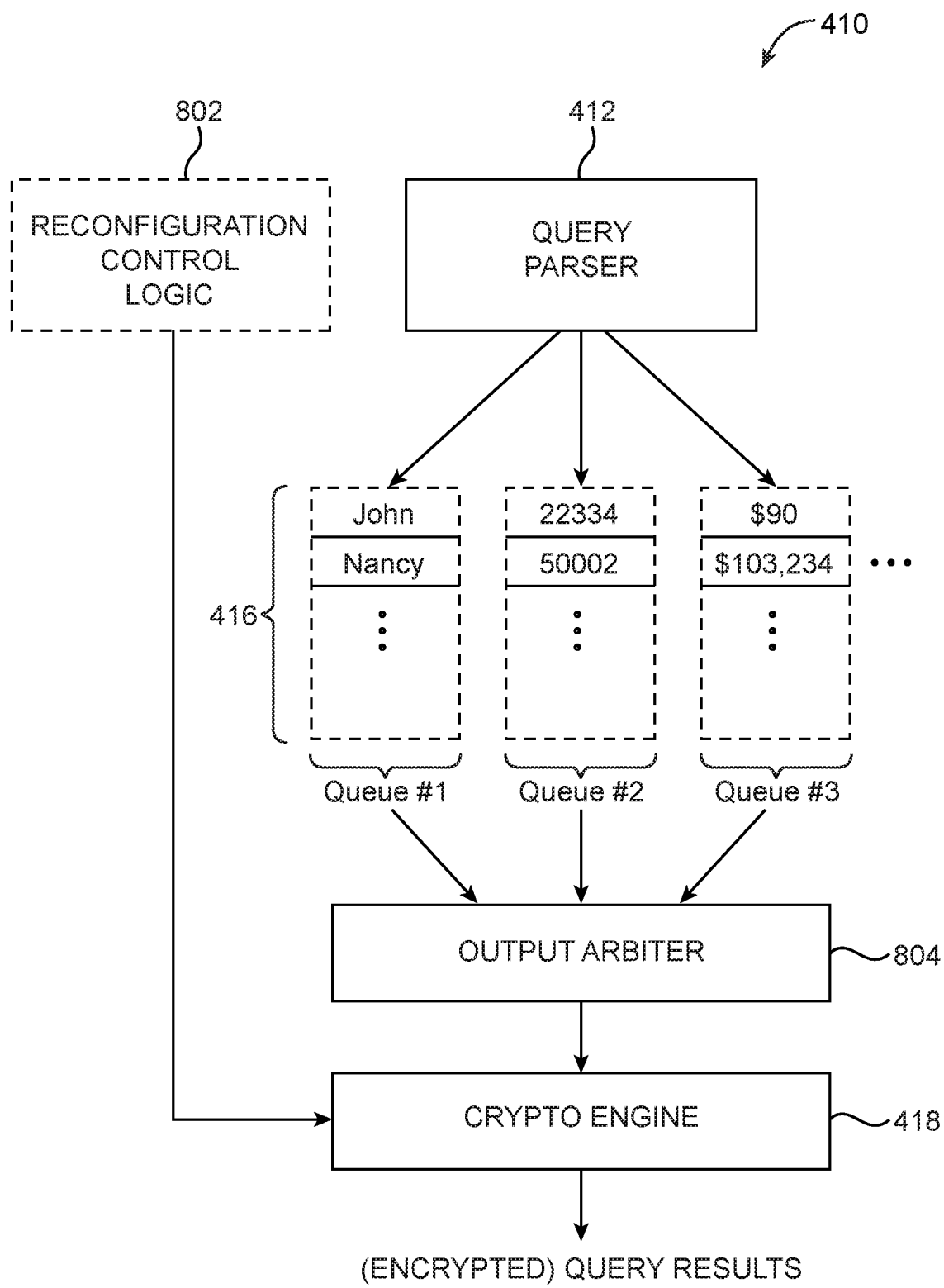
FIG. 8 is a diagram of an illustrative programmable integrated circuit that includes dynamically reconfigurable cache circuitry in accordance with an embodiment.

FIG. 8 illustrates additional details within FPGA 410. In addition to query parser 412, cache 416, and cryptography engine 418, FPGA 410 may further include reconfiguration control logic 802 and output arbiter 804. As shown in FIG. 8, FPGA cache 416 may be further organized into a plurality of queues. In the example of FIG. 8, the name data may be stored in a first queue in the cache, the bank account numbers may be stored in a second queue in the cache, and the bank account balances may be stored in a third queue in the cache (see, e.g., table 500 of FIG. 5A). These queues act as a cache to store part of the database tables based on the queries (e.g., cache 416 stores a subset of records that are available in one or more database tables on the server).

Separating the cache into different queues allows certain queues to be marked as confidential while others are marked as non-confidential. For instance, the bank account numbers and the bank account balances stored in the second and third queues, respectively, may be marked as confidential or sensitive information, whereas the usernames stored in the first queue may be marked as non-confidential or non-sensitive information. In such scenarios, outputs from the second and third queues will be routed to crypto engine 418 using output arbiter 804 to encrypt the confidential data before sending it to the client. Outputs from the first queue can be left unencrypted and can be forwarded directly to the client in unencrypted form.

Reconfiguration control logic 802 may be configured to manage the generation and usage of the various database queues (e.g., control logic 802 may keep track of which queues contain confidential information and which don't). The number and size of the queues may depend on the query and the reconfiguration control logic 802. Reconfiguration control logic 802 may also control crypto engine 418 to encrypt the output data based on the confidentiality requirements.

As described above in connection with FIG. 3, the FPGA may include static and partial dynamically reconfigurable regions. The dotted blocks in FIG. 8 (e.g., reconfiguration control logic 802 and the queues within FPGA cache 416) may represent the reconfigurable components within the FPGA that can be dynamically updated during runtime. The remaining solid blocks in FIG. 8 (e.g., query parser 412, output arbiter 804, and crypto engine 418) may represent the static components within the FPGA that need not be changed during runtime.

Figure 9:
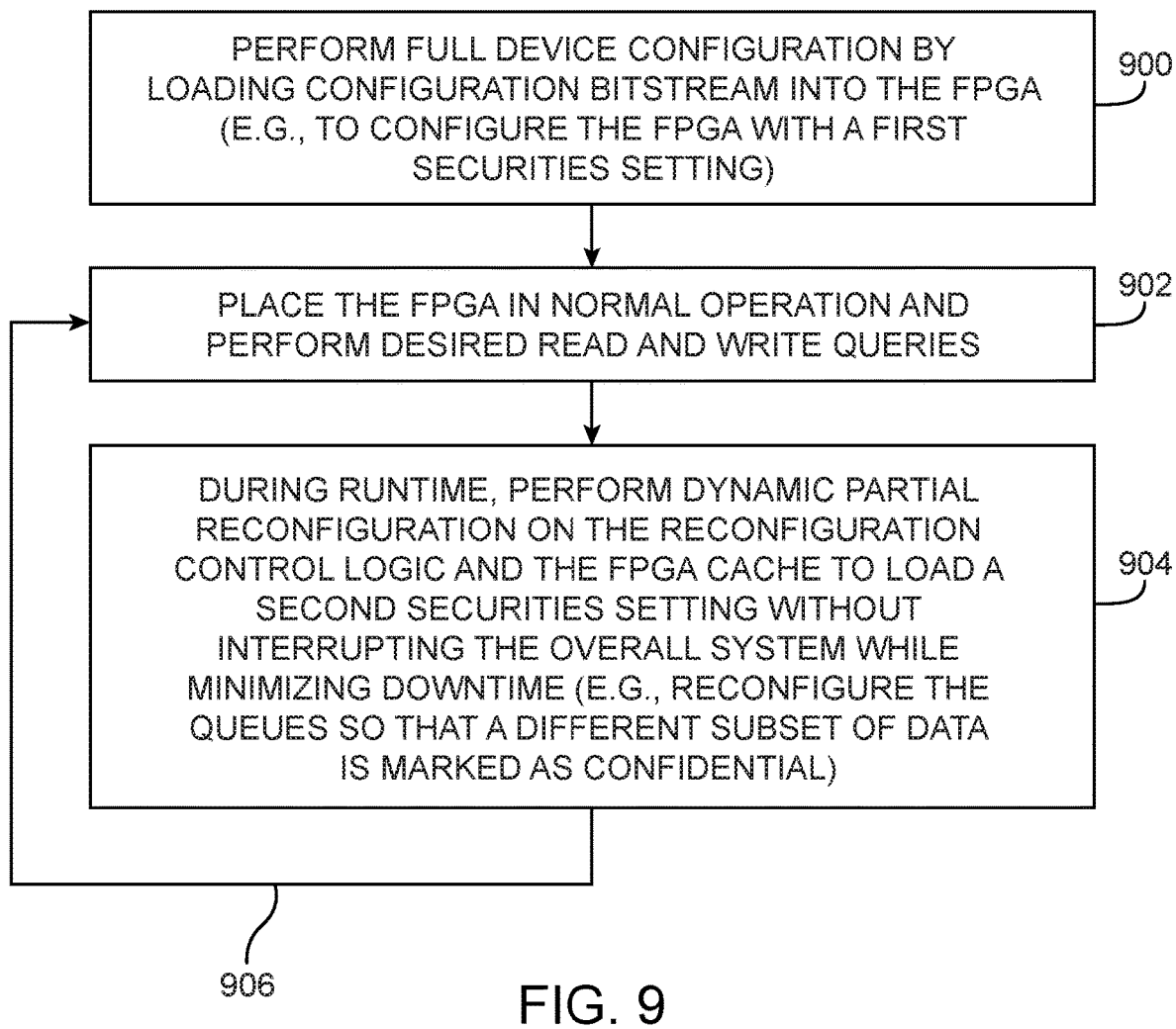
FIG. 9 is a flow chart of illustrative steps for performing dynamic partial reconfiguration (PR) on the programmable integrated circuit of FIG. 8 to adjust database security settings during runtime in accordance with an embodiment.

FIG. 9 is a flow chart of illustrative steps for performing dynamic partial reconfiguration (PR) FPGA 410 to adjust database security settings during runtime. At step 900, full device configuration may be performed by loading a configuration bitstream into FPGA 410. The configuration bitstream (sometimes referred to as a full device image) configures in the entire FPGA (i.e., both the static and reconfigurable regions) with a first database securities setting. At step 902, FPGA 410 may be placed in normal operation to carry out desired caching functions for a client in a database system.

During runtime, when it is desired to implement a new database securities setting, dynamic partial reconfiguration may be performed by only reconfiguring control logic 802 and FPGA cache 416 (e.g., the organization of the queues can be readjusted so that a different subset of data is marked as confidential). The dynamic partial reconfiguration (PR) can be performed without interrupting the overall system while minimizing downtime.

For example, consider a scenario in which table 500 of FIG. 5A is initially configured to store long bank account numbers with 16 digits. Assuming bank account numbers are confidential, all 16 digits may be encrypted and hidden from the user's perspective. If, however, the user would like to see the last four digits of his/her bank account number, a dynamic partial reconfiguration operation can be performed to generate an additional queue for storing the last four digits of the bank account number. Data read from the queue storing the first 12 digits of the bank account number will still be encrypted, but data read from the additional queue storing the last four digits of the bank account number will be left encrypted and is therefore visible to the user. This examples illustrates how dynamic reconfigurability allows FPGA 410 to satisfy different user requirements at runtime without having to power down the entire system, which is tremendously beneficially in commercial database settings.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs), microcontrollers, microprocessors, central processing units (CPUs), graphics processing units (GPUs), etc. Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

EXAMPLES

The following examples pertain to further embodiments.

Example 1 is an integrated circuit, comprising: a database query requesting circuit configured to send a database request to a database server coupled to the integrated circuit; and storage circuitry configured as a database cache that stores data retrieved from the database server, wherein the database cache is partially reconfigurable during runtime to update database security settings on the integrated circuit, and wherein the database security settings determine which portions of the stored data on the database cache are confidential and which portions of the stored data on the database cache are non-confidential.

Example 2 is the integrated circuit of example 1, wherein the data stored on the database cache is optionally unencrypted.

Example 3 is the integrated circuit of any one of examples 1-2, optionally further comprising a cryptography engine configured to encrypt only the confidential data but not the non-confidential data.

Example 4 is the integrated circuit of example 3, wherein the cryptography engine is optionally further configured to decrypt encrypted data received from an external database client.

Example 5 is the integrated circuit of any one of examples 3-4, wherein the cryptography engine optionally belongs to a static partition of the integrated circuit that is not reconfigured while the database cache is partially reconfigured during runtime when updating the database security settings.

Example 6 is the integrated circuit of any one of examples 3-5, wherein the data stored on the database cache is optionally organized into at least first and second queues, wherein the data stored in the first queue is non-confidential, and wherein the data stored in the second queue is confidential.

Example 7 is the integrated circuit of example 6, optionally further comprising an output arbiter configured to selectively route the data from at least one of the first and second queues to the cryptography engine.

Example 8 is the integrated circuit of any one of examples 6-7, optionally further comprising control logic configured to manage the generation and usage of the first and second queues, wherein the control logic is also partially reconfigurable during runtime when updating the database security settings on the integrated circuit.

Example 9 is the integrated circuit of any one of examples 6-8, optionally further comprising a database query parsing circuit configured to receive a database query from a database client.

Example 10 is the integrated circuit of example 9, wherein the received database query requests data, and wherein the database query parsing circuit is optionally further configured to check whether the requested data is available on the database cache.

Example 11 is the integrated circuit of any one of examples 9-10, wherein the database query parsing circuit optionally belongs to a static partition of the integrated circuit that is not reconfigured while the database cache is partially reconfigured during runtime when updating the database security settings.

Example 12 is a method of operating an integrated circuit, the method comprising: with cache circuitry in the integrated circuit, storing database information locally on the integrated circuit; with a query parser integrated circuit, receiving a database query that requests data; with the query parser, determining whether the requested data is currently available on the cache circuitry; and during runtime, performing partial reconfiguration on the cache circuitry without reconfiguring the query parser to update database security settings for the integrated circuit.

Example 13 is the method of example 12, optionally further comprising fetching data from the cache circuitry and checking confidentiality requirements for the fetched data in response to determining that the requested data is currently available on the cache circuitry.

Example 14 is the method of example 13, optionally further comprising: in response to determining that the fetched data is confidential, using a cryptography engine in the integrated circuit to encrypt the fetched data; and sending the encrypted data to a database client.

Example 15 is the method of any one of examples 13-14, optionally further comprising leaving the fetched data unencrypted in response to determining that the fetched data is non-confidential.

Example 16 is the method of any one of examples 12-15, optionally further comprising: in response to determining that the requested data is not available on the cache circuitry, forwarding the database query to a database server; receiving corresponding query results from the database server; storing the query results in the cache circuitry; checking confidentiality requirements for the query results; and selectively encrypting the query results based on the confidentiality requires.

Example 17 is the method of any one of examples 12-16, optionally further comprising: in response to determining that the requested data is currently available on the cache circuitry, updating a corresponding record in the cache circuitry and pushing this update to a database server; and in response to determining that the requested data is not available on the cache circuitry, forwarding the requested data directly to the database server.

Example 18 is a system comprising a programmable device operable to receive a database query from a client device, wherein the programmable device comprises: a query parser configured to process the received database query; and a database cache, wherein the query parser is further configured to determine whether the database query requests data that is available in the database cache, wherein the database cache is part of a dynamically reconfigurable partition of the programmable device that can be updated during runtime without causing system downtime, and wherein the query parser is part of a static partition of the programmable device that remains unchanged.

Example 19 is the system of example 18, optionally further comprising: a database server, wherein the programmable device retrieves data from the database server, wherein the programmable device is configured to communicate with the database server via a trusted communications path, and wherein the programmable device is configured to communicate with the client device via an untrusted communications path.

Example 20 is the system of any one of examples 18-19, wherein the programmable device optionally further comprises: a cryptography engine that is part of the static partition, wherein the database cache stores sensitive and non-sensitive data, and wherein the cryptography engine is configured to encrypt the sensitive data but does not encrypt the non-sensitive data.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. An integrated circuit, comprising:
   a database query parsing circuit configured to receive a database query from an external database client;
   a database query requesting circuit configured to send a database request to a database server coupled to the integrated circuit;
   storage circuitry configured as a database cache that stores data retrieved from the database server, wherein the database cache comprises a first queue for storing non-confidential data and a second queue for storing for confidential data, wherein the database cache is partially reconfigurable during runtime to update database security settings on the integrated circuit from a first database security setting to a second database security setting, and wherein the first database security setting and the second database security setting identify different sets of data stored on the database cache as confidential data; and
   a cryptography engine configured to encrypt at least a portion of the confidential data but not the non-confidential data stored on the database cache in response to the integrated circuit receiving the database query from the external database client.

2. The integrated circuit of claim 1, wherein the data stored on the database cache is unencrypted.

3. The integrated circuit of claim 2, wherein, in response to receiving the database query, the integrated circuit is configured to:
   send at least a portion of the non-confidential data to the external database client; and
   after encrypting the at least a portion of the confidential data, send the at least a portion of the confidential data to the external database client.

4. The integrated circuit of claim 1, wherein the cryptography engine is further configured to decrypt encrypted data received from the external database client.

5. The integrated circuit of claim 1, wherein the cryptography engine belongs to a static partition of the integrated circuit that is not reconfigured while the database cache is partially reconfigured during runtime when updating the database security settings.

6. The integrated circuit of claim 1, further comprising:
   an output arbiter configured to selectively route the data from at least one of the first and second queues to the cryptography engine.

7. The integrated circuit of claim 1, further comprising:
   control logic configured to manage generation and usage of the first and second queues, wherein the control logic is also partially reconfigurable during runtime when updating the database security settings on the integrated circuit.

8. The integrated circuit of claim 1, wherein the received database query requests data, and wherein the database query parsing circuit is further configured to check whether the requested data is available on the database cache.

9. The integrated circuit of claim 1, wherein the database query parsing circuit belongs to a static partition of the integrated circuit that is not reconfigured while the database cache is partially reconfigured during runtime when updating the database security settings.

10. The integrated circuit of claim 1, wherein the integrated circuit comprises a field-programmable gate array (FPGA).

11. A method of operating an integrated circuit, the method comprising:
    with cache circuitry in the integrated circuit, storing database data locally on the integrated circuit, wherein the cache circuitry comprises a plurality of queues having a first queue for storing non-confidential data and a second queue for storing for confidential data;
    with a query parser of the integrated circuit, receiving, from a database client, a database query that requests data;
    with the query parser, determining whether the requested data is currently available on the cache circuitry;
    during runtime, performing partial reconfiguration on the cache circuitry to update database security settings for the integrated circuit by updating data confidentiality requirements for one or more portions of the locally stored database data on the integrated circuit;
    in response to determining that the requested data is currently available on the cache circuitry, fetching data from the cache circuitry and checking confidentiality requirements for the fetched data;
    in response to determining that the fetched data is confidential, using a cryptography engine in the integrated circuit to encrypt the fetched data; and
    sending the encrypted data from the integrated circuit to the database client.

12. The method of claim 11, further comprising:
    in response to determining that the fetched data is non-confidential, leaving the fetched data unencrypted.

13. The method of claim 12, comprising, after determining that the fetched data is non-confidential, sending the fetched data from the integrated circuit to the database client.

14. The method of claim 11, further comprising:
    in response to determining that the requested data is currently available on the cache circuitry, updating a corresponding record in the cache circuitry and pushing a corresponding update to a database server; and
    in response to determining that the requested data is not available on the cache circuitry, forwarding the requested data directly to the database server.

15. The method of claim 11, further comprising:
implementing the cache circuitry at a reconfigurable portion of the integrated circuit.

16. The method of claim 11, wherein the database data is unencrypted.

17. A system, comprising:
a programmable logic device operable to receive a database query from a client device, wherein the programmable logic device comprises:
- a query parser configured to process the received database query;
- a database cache configured to store data of different types in corresponding queues, wherein the query parser is further configured to determine whether the database query requests data that is available in the database cache, wherein each of the corresponding queues in the database cache forms a part of a dynamically reconfigurable partition of the programmable logic device that can be updated during run-time based on a change on the programmable logic device from a first database security setting to a second database security setting, wherein the first database security setting and the second database security setting identify different sets of data stored on the database cache as confidential data, wherein the corresponding queues comprise a first queue for storing non-confidential data and a second queue for storing for confidential data, and wherein the query parser is part of a static partition of the programmable logic device that remains unchanged during a dynamic reconfiguration operation; and
- a cryptography engine configured to encrypt at least a portion of the confidential data in response the programmable logic device receiving the database query.

18. The system of claim 17, further comprising:
a database server, wherein the programmable logic device retrieves data from the database server, wherein the programmable logic device is configured to communicate with the database server via a trusted communications path, and wherein the programmable logic device is configured to communicate with the client device via an untrusted communications path.

19. The system of claim 18, wherein the data stored on the database cache is retrieved from the database server prior to being stored on the database cache.

20. The system of claim 17, wherein the cryptography engine is part of the static partition and does not encrypt the non-confidential data.

* * * * *